US012778124B2

(12) United States Patent
Kanumuru et al.

(10) Patent No.: US 12,778,124 B2
(45) Date of Patent: Nov. 3, 2026

(54) SYNERGISTIC PLANT GROWTH STIMULANT COMPOSITION COMPRISING MELATONIN AND NITROGENOUS COMPOUNDS FOR IMPROVING PLANT GROWTH AND DECREASING BIOTIC-ABIOTIC STRESSES ON PLANTS

(71) Applicant: FERTIS INDIA PVT. LTD., Hyderabad (IN)

(72) Inventors: Rahul Raju Kanumuru, Hyderabad (IN); George Kochumalayil Shaji, Hyderabad (IN); Lakshmi Prasanna Kumar Garudadri, Hyderabad (IN); Ravikumar Suraneni, Hyderabad (IN); Sil Anindya, Hyderabad (IN)

(73) Assignee: FERTIS INDIA PVT. LTD., Hyderabad (IN)

( * ) Notice: Subject to any disclaimer, the term of this patent is extended or adjusted under 35 U.S.C. 154(b) by 296 days.

(21) Appl. No.: 18/551,811

(22) PCT Filed: Mar. 24, 2022

(86) PCT No.: PCT/IN2022/050296
§ 371 (c)(1),
(2) Date: Sep. 21, 2023

(87) PCT Pub. No.: WO2022/201201
PCT Pub. Date: Sep. 29, 2022

(65) Prior Publication Data

US 2024/0172748 A1 May 30, 2024

(30) Foreign Application Priority Data

Mar. 25, 2021 (IN) ............................ 202141013066

(51) Int. Cl.
*A01N 43/38* (2006.01)
*A01N 37/42* (2006.01)
(Continued)

(52) U.S. Cl.
CPC ............ *A01N 43/38* (2013.01); *A01N 37/42* (2013.01); *A01N 43/12* (2013.01); *A01N 47/28* (2013.01);
(Continued)

(58) Field of Classification Search
CPC ........ A01N 43/38; A01N 37/42; A01N 43/12; A01N 47/28; A01N 47/30; A01N 47/34; A01P 21/00
See application file for complete search history.

(56) References Cited

U.S. PATENT DOCUMENTS 2,382,326 A 8/1945 Mecca
8,207,089 B1 6/2012 Fabry
(Continued)

FOREIGN PATENT DOCUMENTS

CN 104945132 A 9/2015
CN 105503415 A 4/2016
(Continued)

OTHER PUBLICATIONS

Barcelos et al, Impact of foliar nickel application on urease activity, antioxidant metabolism and control of powdery mildew (*Microsphaera diffusa*) in soybean plants, 2018, Plant Pathology, pp. 1-12. (Year: 2018).*

(Continued)

*Primary Examiner* — Trevor Love
(74) *Attorney, Agent, or Firm* — Blank Rome LLP

(57) ABSTRACT

The invention disclosed herein is a synergistic plant growth stimulant composition comprising Melatonin and Nitrogenous compounds for improving plant growth, enhancing
(Continued)

yield and decreasing the biotic-abiotic stresses on plants. The invention also disclosed herein is a process for preparation of said synergistic composition.

17 Claims, 4 Drawing Sheets

(51) Int. Cl.

| | |
|---|---|
| ***A01N 43/12*** | (2006.01) |
| ***A01N 47/28*** | (2006.01) |
| ***A01N 47/30*** | (2006.01) |
| ***A01N 47/34*** | (2006.01) |
| ***A01P 21/00*** | (2006.01) |

(52) U.S. Cl.
CPC ............. *A01N 47/30* (2013.01); *A01N 47/34* (2013.01); *A01P 21/00* (2021.08)

(56) References Cited

U.S. PATENT DOCUMENTS

| | | | | |
|---|---|---|---|---|
| 9,549,900 | B2 | 1/2017 | Shah et al. | |
| 10,259,753 | B2 | 4/2019 | Chaudhry | |
| 10,508,060 | B1 | 12/2019 | Roach et al. | |
| 2003/0040436 | A1 | 2/2003 | Emerson et al. | |
| 2003/0104024 | A1 | 6/2003 | Rojas et al. | |
| 2003/0145640 | A1 | 8/2003 | Dean | |
| 2007/0173409 | A1 | 7/2007 | Freire et al. | |
| 2008/0077251 | A1 | 3/2008 | Chen et al. | |
| 2009/0028796 | A1 | 1/2009 | Bednarek et al. | |
| 2009/0038355 | A1 | 2/2009 | Marks | |
| 2014/0274719 | A1 | 9/2014 | Davison | |
| 2015/0031762 | A1 | 1/2015 | Pimentel et al. | |
| 2017/0166488 | A1 | 6/2017 | Chaudhry | |
| 2020/0199096 | A1 | 6/2020 | Kinpara et al. | |
| 2020/0230059 | A1 | 7/2020 | Shah et al. | |
| 2022/0175712 | A1 * | 6/2022 | Granger ................. | A61K 47/34 |
| 2024/0090508 | A1 | 3/2024 | Kanumuru et al. | |
| 2024/0156094 | A1 | 5/2024 | Kanumuru et al. | |
| 2024/0164376 | A1 | 5/2024 | Kanumuru et al. | |
| 2024/0164378 | A1 | 5/2024 | Kanumuru et al. | |
| 2024/0164379 | A1 | 5/2024 | Kanumuru et al. | |
| 2024/0164385 | A1 | 5/2024 | Kanumuru et al. | |

FOREIGN PATENT DOCUMENTS

| | | | |
|---|---|---|---|
| CN | 105917937 | A | 9/2016 |
| CN | 108101669 | A | 6/2018 |
| CN | 110692640 | A | 1/2020 |
| CN | 112062631 | A | 12/2020 |
| EP | 1408761 | B1 | 11/2005 |
| WO | 02102160 | A1 | 12/2002 |
| WO | 2008143961 | A1 | 11/2008 |
| WO | 2013059012 | A1 | 4/2013 |
| WO | 2015036433 | A1 | 3/2015 |
| WO | 2015075676 | A1 | 5/2015 |
| WO | 2017040938 | A1 | 3/2017 |
| WO | 2017043972 | A1 | 3/2017 |
| WO | 2017062856 | A1 | 4/2017 |
| WO | 2019215697 | A1 | 11/2019 |

OTHER PUBLICATIONS

Sangsopha et al, Dietary sources of melatonin and benefits from production of high melatonin pasteurized milk, 2020, J Food Sci Technol, 57(6), pp. 2026-2037. (Year: 2020).*

Sigma Aldrich, L-α-Lysophosphatidylinositol sodium salt from *Glycine max* (soybean), L-7635, 2026, Merck KGaA, pp. 1-10. (Year: 2026).*

Xiao et al, Melatonin Attenuates the Urea-Induced Yields Improvement Through Remodeling Transcriptome and Rhizosphere Microbial, 2022, Frontiers in Microbiology, vol. 13, Article 903467. (Year: 2022).*

"International Search Report issued in PCT/IN2022/050296 on Jul. 28, 2022".

El-Ghamry, et al., "Amino and Humic Acids Promote Growth, Yield and Disease Resistance of Faba Bean Cultivated in Clayey Soil", Australian Journal of Basic and Applied Sciences, 3(2), 731-739, 2009) (Year: 2009).

Kostopoulou, et al., "Melatonin combined with ascorbic acid provides salt adaptation in *Citrus aurantium* L. seedlings", 2015, Plant Physiology and Biochemistry, vol. 86, pp. 155-165. (Year: 2015).

Muñoz, et al., "Phytotoxic Effects of Three Natural Compounds: Pelargonic Acid, Carvacrol, and Cinnamic Aldehyde, against Problematic Weeds in Mediterranean Crops", Agronomy, 2020, 10, 791: pp. 1-20, doi: 10.3390/agronomy10060791 (www.mdpi.com/journal/agronomy).

Sarrou, et al., "Effect of melatonin, salicylic acid and gibberellic acid on leaf essential oil and other secondary metabolites of bitter orange young seedlings", 2015, Journal of Essential Oil Research, pp. 1-10. (Year: 2015).

* cited by examiner

SYNERGISTIC PLANT GROWTH STIMULANT COMPOSITION COMPRISING MELATONIN AND NITROGENOUS COMPOUNDS FOR IMPROVING PLANT GROWTH AND DECREASING BIOTIC-ABIOTIC STRESSES ON PLANTS

CROSS REFERENCE TO RELATED APPLICATIONS

This application is a national stage of International Patent Application No. PCT/IN2022/050296, filed Mar. 24, 2022, which claims the benefit of India application No. 202141013066, filed Mar. 25, 2021.

TECHNICAL FIELD OF THE INVENTION

The present invention relates to a synergistic plant growth stimulant composition comprising Melatonin and Nitrogenous compounds for improving plant growth, enhancing yield and decreasing the biotic-abiotic stresses on plants. The present invention also relates to a process for preparation of said composition.

BACKGROUND AND PRIOR ART OF THE INVENTION

In the environment, plants are continuously being exposed to a number of adverse conditions. Plants relentlessly encounter wide range of environmental stresses which limits the agricultural productivity. Stress in plants refers to external conditions that adversely affect growth, development or productivity of plants. A plant stress usually reflects some sudden changes in environmental condition. Stresses trigger a wide range of plant responses like altered gene expression, cellular metabolism, changes in growth rates, crop yields, etc.

The environmental stresses conferred on plants are divided into two primary categories abiotic stress and biotic stress. Abiotic stress imposed by environment on plants may be either physical or chemical, while as biotic stress exposed to the crop plants is a biological unit like diseases, insects, etc. Some stresses to the plants injured them as such that plants exhibit several metabolic dysfunctions. The plants can be recovered from injuries if the stress is mild or of short term as the effect is temporary, while as severe stresses leads to death of crop plants by preventing flowering, seed formation and induce senescence[i].

Abiotic stresses include salinity, drought, flood, extremes in temperature, heavy metals, radiation, high winds, tornadoes, wildfires etc. It is a foremost factor that causes the loss of major crop plants worldwide. This situation is going to be more rigorous due to increasing desertification of world's terrestrial area, increasing salinization of soil and water, shortage of water resources and environmental pollution[ii].

Biotic stress is stress that occurs as a result of damage done to an organism by other living organisms, such as bacteria, viruses, fungi, parasites, beneficial and harmful insects, oomycetes, nematodes and herbivores. Diseases caused by these pathogens accounts for major yield loss worldwide. Being sessile plants have no choice to escape from these environmental cues. Expertise in tolerating these stresses is crucial for completing the life cycle successfully. Therefore, to combat these threats, plants have developed various mechanisms for getting adapted to such conditions for survival. They sense the external stress environment, get stimulated and then generate appropriate cellular responses[iii].

Marino B. Arnao and Josefa Hernández-Ruiz in an article titled, "*Melatonin: A New Plant Hormone and/or a Plant Master Regulator?*" discloses that, Melatonin is a pleiotropic molecule with many diverse actions in plants. It is considered primarily an antioxidant with important actions in the control of reactive oxygen and nitrogen species (ROS and RNS), among other free radicals, and harmful oxidative molecules present in plant cells. In addition, plant melatonin is involved in multiple physiological actions, such as growth, rooting, seed germination, photosynthesis, and protection against abiotic and/or biotic stressors. This review article discusses the data in respect to Melatonin as plant hormone and as a plant regulator.

Miriam Pardo-Hernández et. al., in a review article titled, "*ROS and NO regulation by melatonin under abiotic stress in plants*" discloses coordination between NO (nitric oxide) and MET (melatonin) as a long-range signaling molecule, regulating many responses in plants, including plant growth and abiotic stress tolerance.

Raziye Kul et. al. in a review article titled, "*Melatonin: Role in Increasing Plant Tolerance in Abiotic Stress Conditions*" discloses and examine the effects of melatonin on plant growth, photosynthetic activity, metabolism, physiology, and biochemistry under abiotic stress conditions as a plant growth regulator.

Mohamed Moustafa-Farag et. al., in a review article titled, "*Melatonin and Its Protective Role against Biotic Stress Impacts on Plants*" summarize the work that has been accomplished so far; highlighting melatonin's function in plant tolerance to pathogens such as bacteria, viruses, and fungi; and determine the direction required for future studies.

Thus, Melatonin is one of the important elements that help in reducing biotic and abiotic stresses on plants. However, increasing global population, urbanization and industrialization are increasing the rate of conversion of arable land into wasteland. Supplying food to an ever-increasing population is one of the biggest challenges that agriculturalists and plant scientists are currently confronting. Environmental stresses make this situation even graver. Despite the induction of several tolerance mechanisms, sensitive plants often fail to survive under environmental extremes. New technological approaches are imperative. Conventional breeding methods have a limited potential to improve plant genomes against environmental stress[iv].

Therefore there is still a need exist in the art to provide an effective solution to such environmental stresses. Thus the inventors of the present invention have come up with a synergistic plant growth stimulant composition comprising Melatonin and Nitrogenous compounds that improves plant growth, enhances yield and decreases the biotic-abiotic stresses on plants, when compare with individual application of Melatonin and Nitrogenous compounds.

The Melatonin helps in nitrogen assimilation and mitochondrial respiration. It maintains balance between carbon and nitrogen metabolism and photosynthesis. Melatonin has antioxidant property that enhances yield with stress tolerance.

Nitrogen is an important component of many essential structural, genetic and metabolic compounds in plant cells. It is also an elementary constituent of numerous important organic compounds including amino acids, proteins, nucleic acids, enzymes and the chlorophyll molecule. Of all the essential nutrients, nitrogen is the one that is most often limiting for crop growth. Nitrogen is the nutrient which normally produces the greatest yield response in crop plants, promoting rapid vegetative growth and giving the plant a healthy green color[v].

Thus inventors of the present invention has combine the nitrogenous compounds with melatonin which is not achieve in the art and prepare a synergistic composition that provide resistance to water logging stress of plants, eliminating ROS (reactive oxygen species), alleviate oxidative damages on the plant caused by water logging stress and biotic stresses, thereby improving plant growth, enhancing yield and decreasing biotic-abiotic stresses on plants as compare to individual application of Melatonin and Nitrogenous compounds.

SUMMARY OF THE INVENTION

In accordance with the above, in a preferred aspect, the present invention describes a synergistic plant growth stimulant composition comprising Melatonin and Nitrogenous compounds along with suitable adjuvants and/or surfactant and/or excipients for improving plant growth, enhancing yield and decreasing biotic-abiotic stresses on plants.

In another preferred aspect, the present invention describes a synergistic plant growth stimulant composition comprising Melatonin and Nitrogenous compounds optionally in combination with plant growth hormones, for improving plant growth, enhancing yield and decreasing biotic-abiotic stresses on plants.

In another preferred aspect, the present invention describes a synergistic plant growth stimulant composition comprising Melatonin and Nitrogenous compounds that improve plant growth, enhance yield and decrease the biotic-abiotic stresses on plants, when compare with individual application of Melatonin and Nitrogenous compounds.

In another preferred aspect, the present invention describes a process for preparation of said synergistic plant growth stimulant composition comprising Melatonin and Nitrogenous compounds.

In yet another preferred aspect, the present invention describes a method of increasing resistance to water logging stress of plants, eliminating ROS (reactive oxygen species), alleviating oxidative damages on the plant caused by water logging stress and biotic stresses by applying synergistic plant growth stimulant composition comprising Melatonin and Nitrogenous compounds on plants.

DETAILED DESCRIPTION OF THE INVENTION

Figure 1:
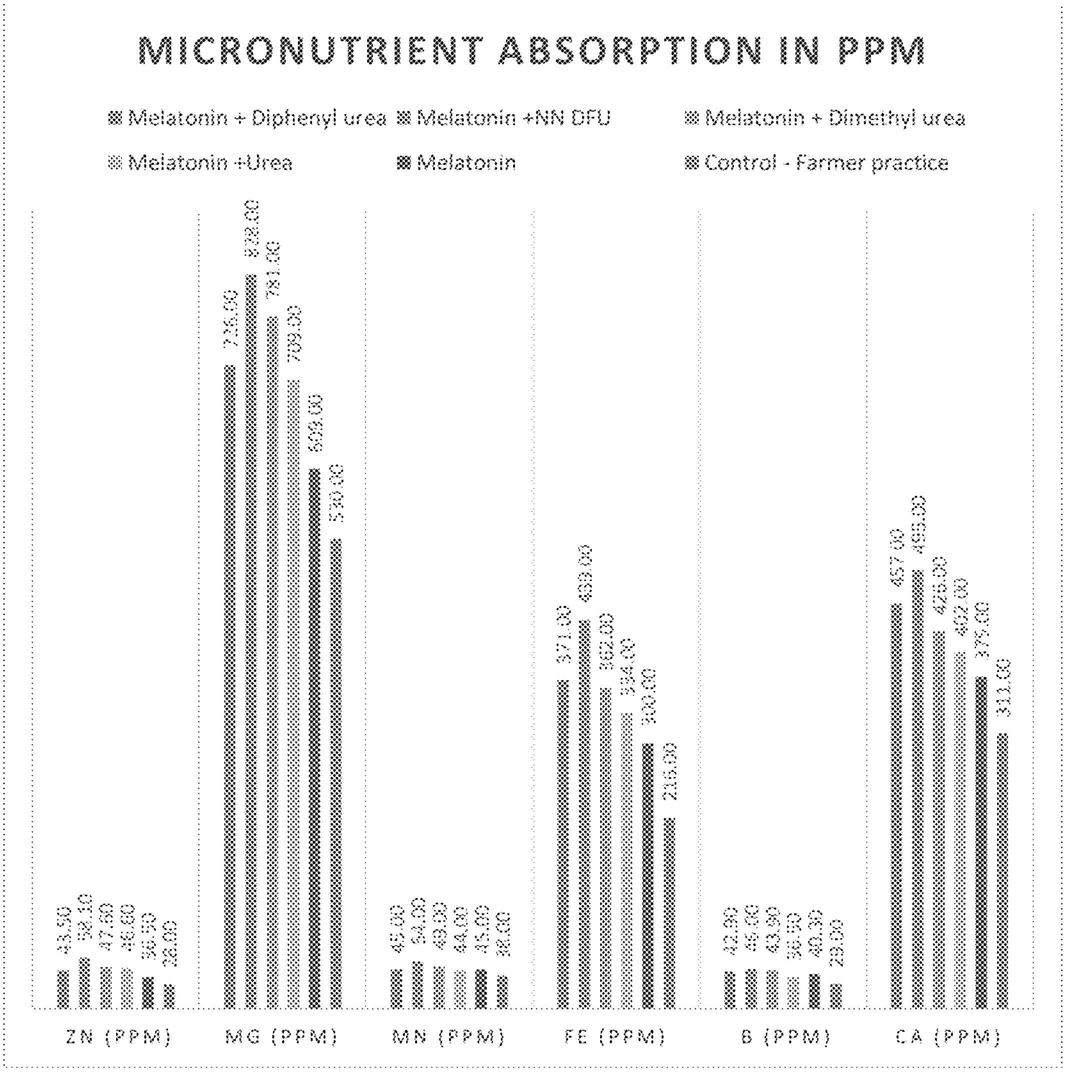
FIG. 1: Comparison of Absorption of micronutrients (in ppm) between composition comprising Melatonin and Nitrogenous compounds Vs. individual melatonin and control.

The invention will now be described in detail in connection with certain preferred and optional embodiments, so that various aspects thereof may be more fully understood and appreciated. The melatonin, nitrogenous compounds and plant growth hormones used in present composition are commercially procured or synthetically manufactured.

The present invention discloses a synergistic plant growth stimulant composition comprising Melatonin and Nitrogenous compounds along with suitable adjuvants and/or surfactant and/or excipients for improving plant growth, enhancing yield and decreasing biotic-abiotic stresses on plants.

The nitrogenous compounds used in the present synergistic composition are selected from urea and its derivatives, amino acids and its derivatives, proteins, protein digest and amines, either alone or in combination thereof.

Accordingly, in an embodiment, the present invention discloses a synergistic plant growth stimulant composition comprising Melatonin and Nitrogenous compounds such as urea and its derivatives selected from N, N'-diformyl urea, N, N'-diacetyl urea, di-substituted diaryl urea, dialkyl urea, diacyl urea, aryl urea, alkyl urea, urea formaldehyde (including oligomers and polymers) and urea acrylamide compounds either alone or in combination thereof.

These nitrogenous compounds improve plant growth (vegetative and flowering/reproductive stage) and quality produce with stress tolerance.

In another embodiment, the present invention discloses a synergistic plant growth stimulant composition comprising Melatonin and Nitrogenous compounds such as amino acids and its derivatives selected from alanine, valine, methionine, leucine, iso-leucine and phenylalanine, either alone or in combination thereof.

In another embodiment, the present invention discloses a synergistic plant growth stimulant composition comprising Melatonin and Nitrogenous compounds such as protein and/or protein hydrolysate and/or peptide combination and/or enzymes, either alone or in combination thereof.

In another embodiment, the present invention discloses a synergistic plant growth stimulant composition comprising Melatonin and Nitrogenous compounds such as amines selected from amidates, imidates, amine salts, amine oxides, polyamines, amines azides and aziridines, either alone or in combination thereof.

The amount of Melatonin used in the present synergistic composition ranges from 0.01% to 10% of the total composition.

The amount of Nitrogenous compounds used in the present synergistic composition ranges from 1 to 50% of the total composition.

The ratio of Melatonin and Nitrogenous compounds in the present synergistic composition varies from 0.5:1, 1:1, 1:10 and 1:20.

In another embodiment, the present invention disclose a synergistic plant growth stimulant composition comprising Melatonin and Nitrogenous compounds optionally in combination with plant growth hormones, for improving plant growth, enhancing yield and decreasing biotic-abiotic stresses on plants.

The plant growth hormones are selected from Gibberelic acid and abscisic acid either alone or in combination thereof.

The amount of plant growth hormones used in the present synergistic composition ranges from 0.05 to 10% of the total composition.

The ratio of Melatonin, Nitrogenous compounds and plant growth hormones in the present synergistic composition varies from 1:10:0.5, 1:20:1, 1:50:1, 1:100:1.

In another embodiment, a synergistic plant growth stimulant composition of the present invention comprises suitable adjuvants and/or surfactant and/or excipients selected from anionic, non-ionic and cationic surfactants viz., carboxy methyl cellulose (CMC), lignosulfonates, and the like.

The adjuvants and/or surfactant and/or excipients used in the synergistic composition are present in an amount ranges from 0.1 to 5% of the total composition.

The surfactant includes a wetting agent selected from poly oxy ethylene sorbitan ester, polyoxyethylene alkyl (or aryl) ether or polyoxyethylene fatty acid ester, anionic surfactants such as straight-chain alkylbenzene sulfonate, dialkylsulfosuccinate, lignin sulfonate or polynaphthyl sulfonate and high molecular compounds such as polyacrylates and a dispersant selected from naphthalene sulfonic acid formaldehyde condensate or lignin sulfonate etc.

The ratio of Melatonin in combination with Nitrogenous compounds and suitable adjuvants/surfactants/excipients is about 1:0.25.

The adjuvants/surfactants/excipients used in the present composition ensure uniform and wide spreading of the composition on the plant when applied, to give complete application of foliage by maintaining surface tension of leaf and molecule contact to the plant.

In another embodiment, a synergistic plant growth stimulant composition of the present invention comprising Melatonin with Nitrogenous compounds can be formulated in the form of solutions and/or powders and/or granules.

The present compositions can be prepared with different concentrations to give specific characteristics of antioxidant and nutritional property along with abiotic and biotic stress controlling capacity to the plants/crops.

In one preferred embodiment, the present invention provides a synergistic plant growth stimulant composition comprising Melatonin and Nitrogenous compounds in a ratio varies from 0.5:1 or 1:1 or 1:10 or 1:20 along with inert excipients such as an adjuvants and/or surfactant in an amount of 0.1 to 5%, for improving plant growth, enhancing yield and decreasing biotic-abiotic stresses on plants.

In one preferred embodiment, the present invention provides a synergistic plant growth stimulant composition comprising Melatonin and Nitrogenous compounds optionally in combination with plant growth hormones in a ratio varies from 1:10:0.5, 1:20:1, 1:50:1, 1:100:1 along with inert excipients such as an adjuvants and/or surfactant in an amount of 0.1 to 5%, for improving plant growth, enhancing yield and decreasing biotic-abiotic stresses on plants.

In yet another preferred embodiment, the present invention provides a synergistic plant growth stimulant composition comprising (i) Melatonin and Nitrogenous compounds and/or composition comprising (ii) Melatonin, Nitrogenous compounds and plant growth hormones that exhibits increase plant growth, enhance yield and decrease the biotic-abiotic stresses on plants, when compare with individual application of Melatonin and Nitrogenous compounds.

In another preferred embodiment, the present invention provides a process for preparation of said synergistic plant growth stimulant composition comprising Melatonin and Nitrogenous compounds comprising the steps of;

a) Dissolving melatonin in DMSO (Dimethyl sulfoxide);
b) dissolving nitrogenous compounds in water;
c) mixing together the solutions of step (a) and step (b) in a ratio varies from 0.5:1 or 1:1 or 1:10 or 1:20;
d) adding adjuvants/surfactants to the solution of step (c) in a ratio of 1:10, followed by making up to 300 ml volume per acre; and
e) diluting the solution of step (d) with water for foliar application on crop.

In another preferred embodiment, the present invention provides a process for preparation of said synergistic plant growth stimulant composition comprising Melatonin and Nitrogenous compounds in combination with plant growth hormones comprising the steps of;

a) Dissolving melatonin in DMSO (Dimethyl sulfoxide);
b) dissolving nitrogenous compounds in water;
c) dissolving plant growth hormones in ethanol;
d) mixing together the solutions of step (a), step (b) and step (c) in a ratio varies from 1:10:0.5 or 1:20:1 or 1:50:1 or 1:100:1.
e) adding adjuvants/surfactants to the solution of step (d) in a ratio of 1:10, followed by making up to 300 ml volume per acre; and
f) diluting the solution of step (e) with water for foliar application on crop.

In another preferred embodiment, the present invention provides a method of increasing resistance to waterlogging stress of plants, eliminating ROS (reactive oxygen species), alleviating oxidative damages on the plant caused by water logging stress and biotic stresses by spraying (i) a synergistic plant growth stimulant composition comprising Melatonin and Nitrogenous compounds and/or (ii) a synergistic plant growth stimulant composition comprising Melatonin and Nitrogenous compounds with plant growth hormones; on leaves as foliar application or by mixing in soil as fertilizer application.

In yet another embodiment, the present invention discloses (i) a synergistic plant growth stimulant composition comprising Melatonin and Nitrogenous compounds and/or (ii) a synergistic plant growth stimulant composition comprising Melatonin and Nitrogenous compounds with plant growth hormones; wherein the amount of said composition (s) applied/sprayed on leaves as foliar application or by mixing in soil as fertilizer application is ranges from 0.3 kg to 1 kg per acre.

In yet another embodiment, the present invention discloses (i) a synergistic plant growth stimulant composition comprising Melatonin and Nitrogenous compounds and/or (ii) a synergistic plant growth stimulant composition comprising Melatonin and Nitrogenous compounds with plant growth hormones; wherein said composition(s) are useful for improving plant growth, enhancing yield, increasing resistance to water-logging stress of plants, eliminating ROS (reactive oxygen species) and alleviating oxidative damages on the plant caused by water logging stress and biotic stresses.

In yet another preferred embodiment, the present invention provides a synergistic plant growth stimulant composition comprising (i) Melatonin and Nitrogenous compounds and/or composition comprising (ii) Melatonin, Nitrogenous compounds and plant growth hormones, that exhibits increasing resistance to water-logging stress of plants, eliminating ROS (reactive oxygen species), alleviating oxidative damages on the plant caused by water logging stress and biotic stresses, when compare with individual application of Melatonin and Nitrogenous compounds.

In yet another embodiment, the present invention discloses that, the water logging stress of plants is eliminated by foliar application of a synergistic plant growth stimulant composition comprising (i) Melatonin and Nitrogenous compounds and/or composition comprising (ii) Melatonin, Nitrogenous compounds and plant growth hormones; wherein said composition provides antioxidants to plants and these antioxidants gives strength to plants, avoids cell damages occurs through ROS (reactive oxygen species) and develop stress tolerance capacity in plants.

In yet another embodiment, the present invention discloses that a synergistic plant growth stimulant composition comprising Melatonin and Nitrogenous compounds exhibits higher amount of micronutrients, Phenol concentration, % of protein and total protein content in plant as compared to individual melatonin, nitrogenous compounds, plant growth hormone and control respectively. The same is depicted in below Examples 9 to 12 and FIGS. 1 to 4.

In yet another embodiment, the present invention discloses a synergistic plant growth stimulant composition comprising Melatonin and Nitrogenous compounds optionally with plant growth hormones for improving plant growth, enhancing yield and decreasing the biotic-abiotic stresses on plants; wherein the plant is selected from the group consisting of cucurbit vegetables, peppers, potatoes, carrots, radishes, grapes, cole crops, leafy vegetables and tomatoes.

Some typical examples illustrating the embodiments of the present invention are provided; however, these examples are exemplary only and should not be regarded as limiting the elements of the present invention.

EXAMPLES

Example 1: Compositions Comprising Melatonin and Nitrogenous Compounds (Urea)

| Sr. No. | Ingredients | Composition 1 Quantity (gm/acre) | Composition 2 Quantity (gm/acre) | Composition 3 Quantity (gm/acre) |
|---|---|---|---|---|
| 1. | Melatonin | 1.125 | 2.25 | 4.5 |
| 2. | Urea | 100 | 200 | 400 |
| 3. | Adjuvants/ surfactants | 5 | 10 | 15 |
| | Total weight in g | 106.125 | 212.25 | 419.5 |

Example 2: Compositions Comprising Melatonin and Nitrogenous Compounds (Diacetyl Urea)

| Sr. No. | Ingredients | Composition 4 Quantity (g/acre) | Composition 5 Quantity (g/acre) | Composition 6 Quantity (g/acre) |
|---|---|---|---|---|
| 1. | Melatonin | 1.125 | 2.25 | 4.5 |
| 2. | Diacetyl urea | 25 | 50 | 100 |
| 3. | Adjuvants/ surfactants | 5 | 10 | 15 |
| | Total weight in gm | 31.25 | 62.25 | 119.5 |

Example 3: Compositions Comprising Melatonin and Nitrogenous Compounds (Di Aryl Urea)

| Sr. No. | Ingredients | Composition 7 Quantity (g/acre) | Composition 8 Quantity (g/acre) | Composition 9 Quantity (g/acre) |
|---|---|---|---|---|
| 1. | Melatonin | 1.125 | 2.25 | 4.5 |
| 2. | Di aryl urea | 25 | 50 | 100 |
| 3. | Adjuvants/ surfactants | 5 | 10 | 15 |
| | Total weight in gm | 31.125 | 62.25 | 119.5 |

Example 4: Compositions Comprising Melatonin and Nitrogenous Compounds (Aryl Urea)

| Sr. No. | Ingredients | Composition 10 Quantity (g/acre) | Composition 11 Quantity (g/acre) | Composition 12 Quantity (g/acre) |
|---|---|---|---|---|
| 1. | Melatonin | 1.125 | 2.25 | 4.5 |
| 2. | Aryl urea | 25 | 50 | 100 |
| 3. | Adjuvants/ surfactants | 5 | 10 | 15 |
| | Total weight in gm | 31.125 | 62.25 | 119.5 |

Example 5: Compositions Comprising Melatonin and Nitrogenous Compounds (Diphenyl Urea)

| Sr. No. | Ingredients | Composition 13 Quantity (gm/acre) | Composition 14 Quantity (gm/acre) | Composition 15 Quantity (gm/acre) |
|---|---|---|---|---|
| 1. | Melatonin | 1.125 | 2.25 | 4.5 |
| 2. | Diphenyl urea | 25 | 50 | 100 |
| 3. | Adjuvants/ surfactants | 5 | 10 | 15 |
| | Total weight in gm | 31.125 | 62.25 | 119.5 |

Example 6: Compositions Comprising Melatonin and Nitrogenous Compounds (Dimethyl Urea)

| Sr. No. | Ingredients | Composition 16 Quantity (g/acre) | Composition 17 Quantity (g/acre) | Composition 18 Quantity (g/acre) |
|---|---|---|---|---|
| 1. | Melatonin | 1.125 | 2.25 | 4.5 |
| 2. | Dimethyl urea | 25 | 50 | 100 |
| 3. | Adjuvants/ surfactants | 5 | 10 | 15 |
| | Total weight in gm | 31.125 | 62.25 | 119.5 |

Example 7: Compositions Comprising Melatonin and Nitrogenous Compounds [N,N'-Diformyl Urea (NN-DFU)]

| Sr. No. | Ingredients | Composition 19 Quantity (g/acre) | Composition 20 Quantity (g/acre) | Composition 21 Quantity (g/acre) |
|---|---|---|---|---|
| 1. | Melatonin | 1.125 | 2.25 | 4.5 |
| 2. | NN-DFU | 25 | 50 | 100 |
| 3. | Adjuvants/ surfactants | 5 | 10 | 15 |
| | Total weight in gm | 31.125 | 62.25 | 119.5 |

Example 8: Compositions Comprising Melatonin and Nitrogenous Compounds and Plant Growth Hormones

| Sr. No. | Ingredients | Composition 22 (g/acre) | Composition 23 (g/acre) |
|---|---|---|---|
| 1. | Melatonin | 1.125 | 4.5 |
| 2. | Urea | 100 | 400 |
| 3. | Diacetyl urea | 25 | 100 |
| 4. | Diaryl urea | 25 | 100 |
| 5. | Aryl urea | 25 | 100 |
| 6. | Gibberellic acid | 1 | 4 |
| 7. | Abscisic acid | 0.5 | 2 |
| 8. | Adjuvants/ surfactants | 5 | 20 |
| | Total weight in gm | 182.65 | 730.5 |

e) diluting the solution of step (d) with 200 lit of water for foliar application on crop.

Example 8: Process for Preparation of Present Composition (with Plant Growth Hormones)

a) Dissolving 2.25 gm of melatonin in 10 ml of DMSO (Dimethyl sulfoxide);

b) dissolving 100 gm of nitrogenous compounds in 100 ml of water;

c) dissolving 1.125 gm of plant growth hormones in 10 ml of ethanol;

d) mixing solutions of step (a), step (b) and step (c) in a ratio ranging from 1:10:0.5, 1:20:1, 1:50:1, 1:100:1.

e) adding 10 ml of adjuvants/surfactants to solution of step (d) in a ratio of 1:10, followed by making up to 300 ml volume per acre; and f) diluting the solution of step (e) with 200 lit of water for foliar application on crop.

Experimental Results:

Example 9: Micronutrient Analysis in Grain

Field trail results on Paddy—Area 10-meter square 1 gm/liter Foliar Application

| Sr. No. | Sample Name | Example No. | Zn (Zinc) (ppm) | Mg (Magnesium) (ppm) | Mn (Manganese) (ppm) | Fe (Iron) (ppm) | B (Boron) (ppm) | Ca (Calcium) (ppm) |
|---|---|---|---|---|---|---|---|---|
| 1. | Control - Farmer Practice* | — | 28.00 | 530.00 | 38.00 | 216.00 | 29.00 | 311.00 |
| 2. | Melatonin | — | 36.50 | 609.00 | 45.00 | 300.00 | 40.30 | 375.00 |
| 3. | Melatonin + Diphenyl urea | Example 5 | 43.50 | 726.00 | 45.00 | 371.00 | 42.90 | 457.00 |
| 4. | Melatonin + NN DFU | Example 7 | 58.10 | 828.00 | 54.00 | 439.00 | 46.00 | 455.00 |
| 5. | Melatonin + Dimethyl urea | Example 6 | 47.60 | 781.00 | 49.00 | 362.00 | 43.90 | 486.00 |
| 6. | Melatonin + Urea | Example 1 | 46.60 | 709.00 | 44.00 | 334.00 | 36.50 | 472.00 |

*Farmer Practice - All kinds of N, P, K fertilizers and supplements

Example 9: Process for Preparation of Present Composition (without Plant Growth Hormones)

a) Dissolving 2.25 gm of melatonin in 10 ml of DMSO (Dimethyl sulfoxide);

b) dissolving 100 gm of nitrogenous compounds (urea/Diacetyl urea/Diaryl urea/Aryl urea/Diphenyl urea/Dimethyl urea/N,N'-diformyl urea) in 100 ml of water;

c) mixing solutions of step (a) and step (b) in a ratio ranging from 0.5:1 or 1:1 or 1:10 or 1:20;

d) adding 10 ml of adjuvants/surfactants to solution of step (c) in a ratio of 1:10, followed by making up to 300 ml volume per acre; and The values achieved in above table also demonstrated in the form of Figure. It is clear from above Example 9 and FIG. 1 provided below that the Composition comprising Melatonin and Nitrogenous compounds exhibits presence of higher amount of micronutrients as compare to individual melatonin and control.

Example 10: Phenol Concentration in Grain

Field trail results on Paddy—Area 10-meter square 1 gm/liter Foliar Application

| Sr. No. | Sample Name | Example No. | Phenol Conc (ppm) |
|---|---|---|---|
| 1. | Control - Farmer Practice* | — | 16.2800 |
| 2. | Melatonin + Diphenyl urea | Example 5 | 21.6239 |
| 3. | Melatonin + Urea | Example 1 | 22.3578 |
| 4. | Melatonin + Dimethyl urea | Example 6 | 21.8991 |
| 5. | Melatonin + NN DFU | Example 7 | 24.2844 |

*Farmer Practice - All kinds of N, P, K fertilizers and supplements

Figure 2:
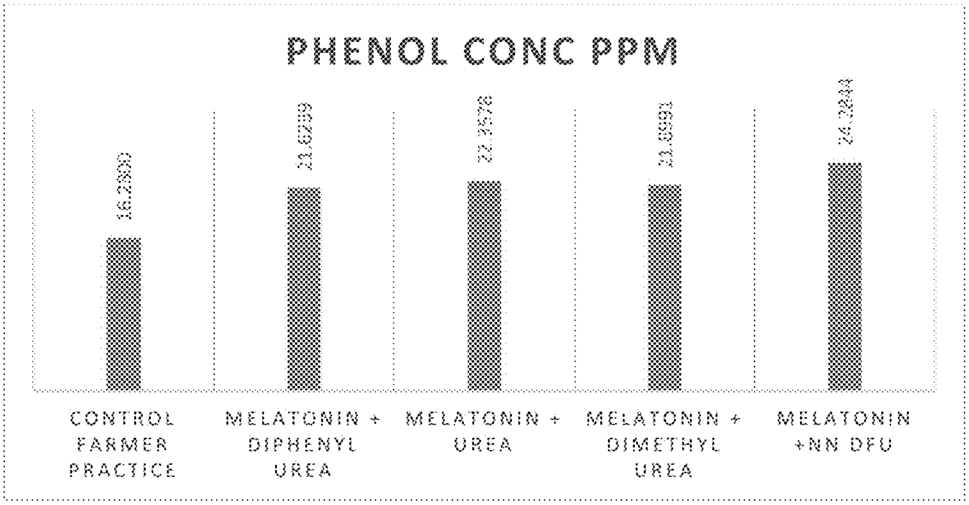
FIG. 2: Comparison of Phenol concentration (in ppm) between composition comprising Melatonin and Nitrogenous compounds Vs. control.

The values achieved in above table also demonstrated in the form of Figure. It is clear from above Example 10 and FIG. 2 provided below that the Composition comprising Melatonin and Nitrogenous compounds exhibits presence of higher amount of Phenol concentration as compare to control.

Example 11: Percentage of Protein in Grain

Field trail results on Paddy—Area 10-meter square 1 gm/liter Foliar Application

| Sr. No. | Sample Name | Example No. | % of Protein |
|---|---|---|---|
| 1. | Control - Farmer Practice* | — | 0.0060 |
| 2. | Urea | — | 0.0063 |
| 3. | Diphenyl urea | — | 0.0089 |
| 4. | Dimethyl urea | — | 0.0081 |
| 5. | Melatonin + Diphenyl urea | Example 5 | 0.0109 |
| 6. | Melatonin + Dimethyl urea | Example 6 | 0.0108 |
| 7. | Melatonin + Urea | Example 1 | 0.0112 |
| 8. | NN DFU | — | 0.0117 |
| 9. | Melatonin + NN DFU | Example 7 | 0.0142 |

*Farmer Practice - All kinds of N, P, K fertilizers and supplements

Figure 3:
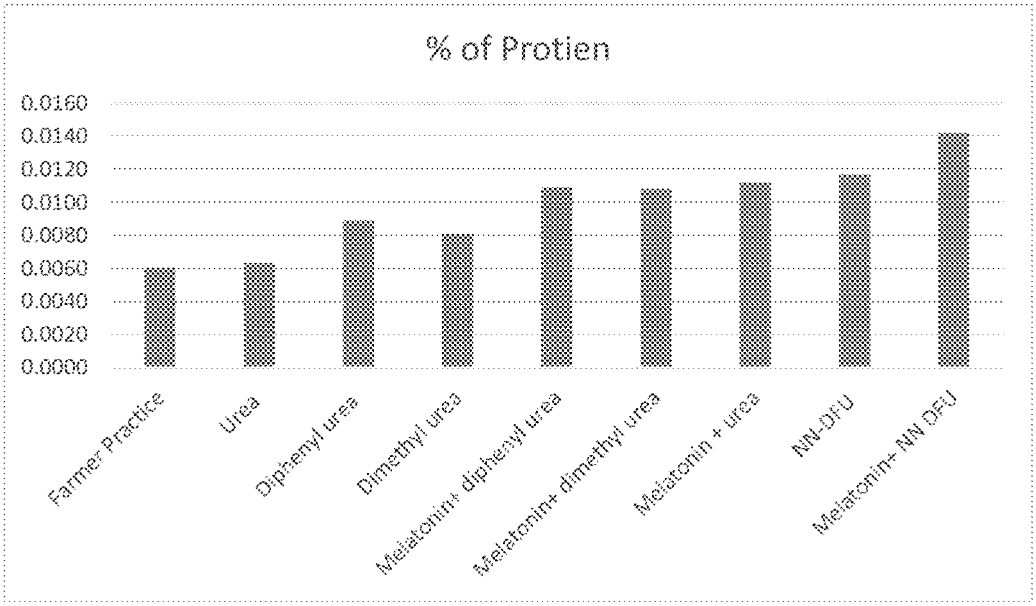
FIG. 3: Comparison of % of protein between composition comprising Melatonin and Nitrogenous compounds Vs. individual melatonin, individual nitrogenous compounds and control.

The values achieved in above table also demonstrated in the form of Figure. It is clear from above Example 11 and FIG. 3 provided below that the Composition comprising Melatonin and Nitrogenous compounds exhibits presence of higher amount of % of protein as compare to individual melatonin, individual nitrogenous compounds and control.

Example 12: Methionin with Plant Growth Hormone—Total Protein Content in Percentage in Grain Field trail results on Paddy—Area 10-meter square lgm/liter Foliar Application

| Sr. No. | Sample Name | Example No. | Total Protein content in % |
|---|---|---|---|
| 1. | Control - Farmer Practice* | — | 0.068 |
| 2. | Melatonin | — | 0.076 |
| 3. | Gibberellic acid | — | 0.084 |
| 4. | Melatonin + Gibberellic acid | — | 0.094 |

*Farmer Practice - All kinds of N, P, K fertilizers and supplements

Figure 4:
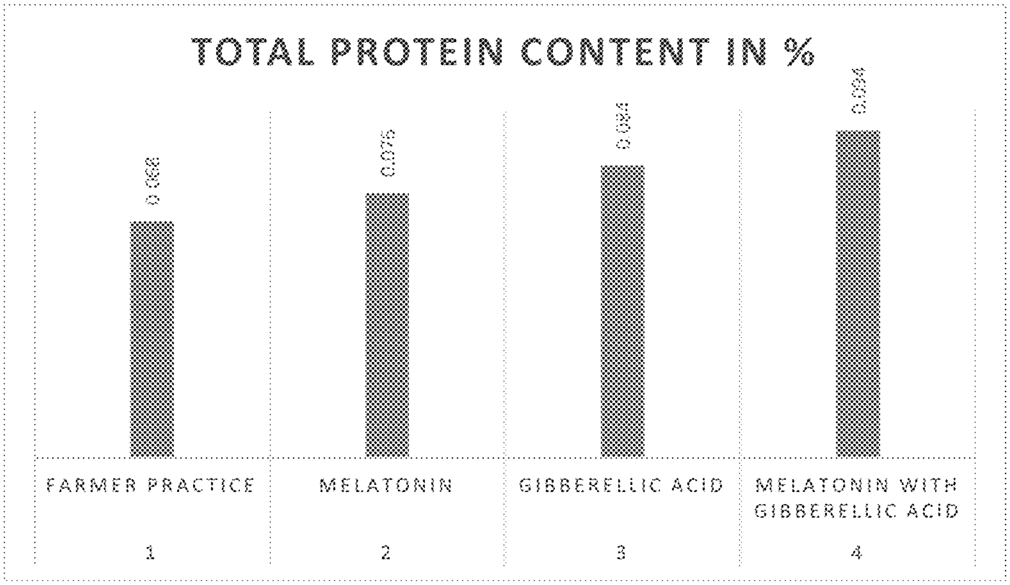
FIG. 4: Comparison of total protein content between composition comprising Melatonin and Plant growth hormones Vs. individual melatonin, individual Gibberellic acid and control.

The values achieved in above table also demonstrated in the form of Figure. It is clear from above Example 12 and FIG. 4 provided below that the Composition comprising Melatonin and Plant growth hormones exhibits presence of higher amount of total protein content as compare to individual melatonin, individual Gibberellic acid and control.

REFERENCES

[i]https://www.researchgate.net/publication/336535346_Biotic_and_Abiotic_Stresses_in_Plants

[ii]http://www.jnkvv.org/PDF/04042020191500Biotic%20stress.pdf

[iii]http://www.jnkvv.org/PDF/04042020191500Biotic%20stress.pdf

[iv]https://academic.oup.com/aobpla/article/9/4/plx025/3894178

[v]https://www.iclfertilizers.com/nitrogen

We claim:

1. A synergistic plant growth stimulant composition for improving plant growth, enhancing yield and decreasing biotic-abiotic stresses on plants comprising:

a) Melatonin;

b) Nitrogenous compounds selected from N,N'-diformyl urea, dimethyl urea, and any combination thereof; and c) adjuvants and/or surfactant and/or excipients;

wherein the ratio of Melatonin and Nitrogenous compounds is 1:50 (w/w).

2. The synergistic plant growth stimulant composition as claimed in claim 1, wherein the Melatonin is present in an amount ranging from 0.06% to 5% by weight of the total composition.

3. The synergistic plant growth stimulant composition as claimed in claim 1, further comprising amino acids and derivatives thereof selected from alanine, valine, methionine, leucine, iso-leucine and phenylalanine, and any combination thereof.

4. The synergistic plant growth stimulant composition as claimed in claim 1, further comprising proteins or protein digests selected from protein hydrolysates peptides, enzymes, and any combination thereof.

5. The synergistic plant growth stimulant composition as claimed in claim 1, further comprising amines selected from amidates, imidates, amine salts, amine oxides, polyamines, amine azides, aziridines, and any combination thereof.

6. The synergistic plant growth stimulant composition as claimed in claim 1, wherein the adjuvants and/or surfactant and/or excipients are selected from anionic, non-ionic and cationic surfactants, carboxy methyl cellulose (CMC), and lignosulfonates.

7. The synergistic plant growth stimulant composition as claimed in claim 6, wherein the adjuvants and/or surfactant and/or excipients are present in an amount of 0.1% to 5% by weight of the total composition.

8. The synergistic plant growth stimulant composition as claimed in claim 6, wherein the composition has a [Melatonin+Nitrogenous compounds] to adjuvants/surfactant/excipients ratio of 1:0.25 by weight.

9. The synergistic plant growth stimulant composition as claimed in claim 1, wherein the composition further comprises plant growth hormones selected from gibberelic acid and abscisic acid.

10. The synergistic plant growth stimulant composition as claimed in claim 9, wherein the plant growth hormones are present in an amount of 0.05% to 10% by weight of the total composition.

11. The synergistic plant growth stimulant composition as claimed in claim 9, wherein the ratio of said composition and plant growth hormones is in a range from 100:0.5 to 100:1 by weight.

12. A process for the preparation of a synergistic plant growth stimulant composition according to claim 1, the process comprising:

a) dissolving melatonin in DMSO (Dimethyl sulfoxide);

b) dissolving the nitrogenous compounds in water;

c) mixing together the solutions of step (a) and step (b);

d) adding adjuvants/surfactants to the solution of step (c); and e) diluting the solution of step (d) with water for foliar application on crop.

13. A process for the preparation of a synergistic plant growth stimulant composition according to claim 9, the process comprising:

a) dissolving melatonin in DMSO (Dimethyl sulfoxide);
b) dissolving the nitrogenous compounds in water;
c) dissolving plant growth hormones in ethanol;
d) mixing together the solutions of step (a), step (b) and step (c);
e) adding adjuvants/surfactants to the solution of step (d); and
f) diluting the solution of step (e) with water for foliar application on crop.

14. A method of increasing resistance to water-logging stress of plants, eliminating ROS (reactive oxygen species), alleviating oxidative damages on a plant caused by water logging stress and biotic stresses, the method comprising spraying a synergistic plant growth stimulant composition according to claim 1 on leaves as foliar application or by mixing in soil as fertilizer application.

15. The synergistic plant growth stimulant composition as claimed in claim 9, wherein said compositions are useful for improving plant growth, enhancing yield, increasing resistance to water-logging stress of plants, eliminating ROS (reactive oxygen species) and alleviating oxidative damages on the plant caused by water logging stress and biotic stresses.

16. A method of increasing resistance to water-logging stress of plants, eliminating ROS (reactive oxygen species), alleviating oxidative damages on a plant caused by water logging stress and biotic stresses, the method comprising spraying a synergistic plant growth stimulant composition according to claim 9 on leaves as foliar application or by mixing in soil as fertilizer application.

17. The synergistic plant growth stimulant composition as claimed in claim 1, wherein the Nitrogenous compounds are present in an amount ranging from 1% to 50% by weight of the total composition.

* * * * *